(12) United States Patent
Lee et al.

(10) Patent No.: US 12,439,379 B2
(45) Date of Patent: Oct. 7, 2025

(54) METHOD AND APPARATUS FOR PERFORMING RESOURCE POOL-BASED SIDELINK COMMUNICATION IN NR V2X

(71) Applicant: LG ELECTRONICS INC., Seoul (KR)

(72) Inventors: Jongyoul Lee, Seoul (KR); Youngdae Lee, Seoul (KR); Giwon Park, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 329 days.

(21) Appl. No.: 17/637,402

(22) PCT Filed: Jul. 8, 2020

(86) PCT No.: PCT/KR2020/008873
§ 371 (c)(1),
(2) Date: Feb. 22, 2022

(87) PCT Pub. No.: WO2021/040223
PCT Pub. Date: Mar. 4, 2021

(65) Prior Publication Data
US 2022/0287009 A1 Sep. 8, 2022

Related U.S. Application Data

(60) Provisional application No. 62/910,419, filed on Oct. 3, 2019.

(30) Foreign Application Priority Data

Aug. 23, 2019 (KR) .......................... 10-2019-0103955
Feb. 13, 2020 (KR) .......................... 10-2020-0017664

(51) Int. Cl.
*H04W 72/02* (2009.01)
*H04W 72/0446* (2023.01)
(Continued)

(52) U.S. Cl.
CPC ....... *H04W 72/02* (2013.01); *H04W 72/0446* (2013.01); *H04W 72/21* (2023.01); *H04W 72/23* (2023.01)

(58) Field of Classification Search
CPC . H04W 72/02; H04W 72/0446; H04W 72/21; H04W 72/23; H04W 4/40; H04W 48/10; H04W 48/14; H04W 92/18
See application file for complete search history.

(56) References Cited

U.S. PATENT DOCUMENTS

2021/0022055 A1* 1/2021 Tseng .................... H04L 5/0092

FOREIGN PATENT DOCUMENTS

WO WO-2016164510 A1 * 10/2016 ............. H04W 4/70
WO 2017/075798 A1 5/2017
(Continued)

OTHER PUBLICATIONS

Nokia, "Correction on Exceptional Pool's Resource Selection", R2-1701268, 3GPP TSG RAN WG2 Meeting #97, Athens, Greece, Feb. 3, 2017, See Section 23.14.1.1.
(Continued)

*Primary Examiner* — Jianye Wu
(74) *Attorney, Agent, or Firm* — BRYAN CAVE LEIGHTON PAISNER LLP

(57) ABSTRACT

According to an embodiment of the present disclosure, provided is a method by which a first apparatus performs sidelink communication. The method may comprise the steps of: transmitting a first transport block to a second apparatus, on a resource allocated by a first SL grant received from a base station; transmitting, to the base station, a system information request message requesting system information; transmitting, on an exceptional resource pool, a second transport block to the second apparatus, on the basis of the transmission of the system information
(Continued)

request message to the base station; and receiving, from the base station, first system information related to the system information request message.

12 Claims, 29 Drawing Sheets

(51) Int. Cl.
   *H04W 72/21* (2023.01)
   *H04W 72/23* (2023.01)

(56) References Cited

FOREIGN PATENT DOCUMENTS

| WO | 2017/148236 A1 | | 9/2017 | | |
|----|----|----|----|----|----|
| WO | WO-2017176099 | * | 10/2017 | ........... | H04L 1/0061 |
| WO | WO-2017176099 A1 | * | 10/2017 | ........... | H04L 1/0061 |

OTHER PUBLICATIONS

3GPP TS 36.331 V15.8.0; "System Information Blocks"; Section 6.3.1.

* cited by examiner

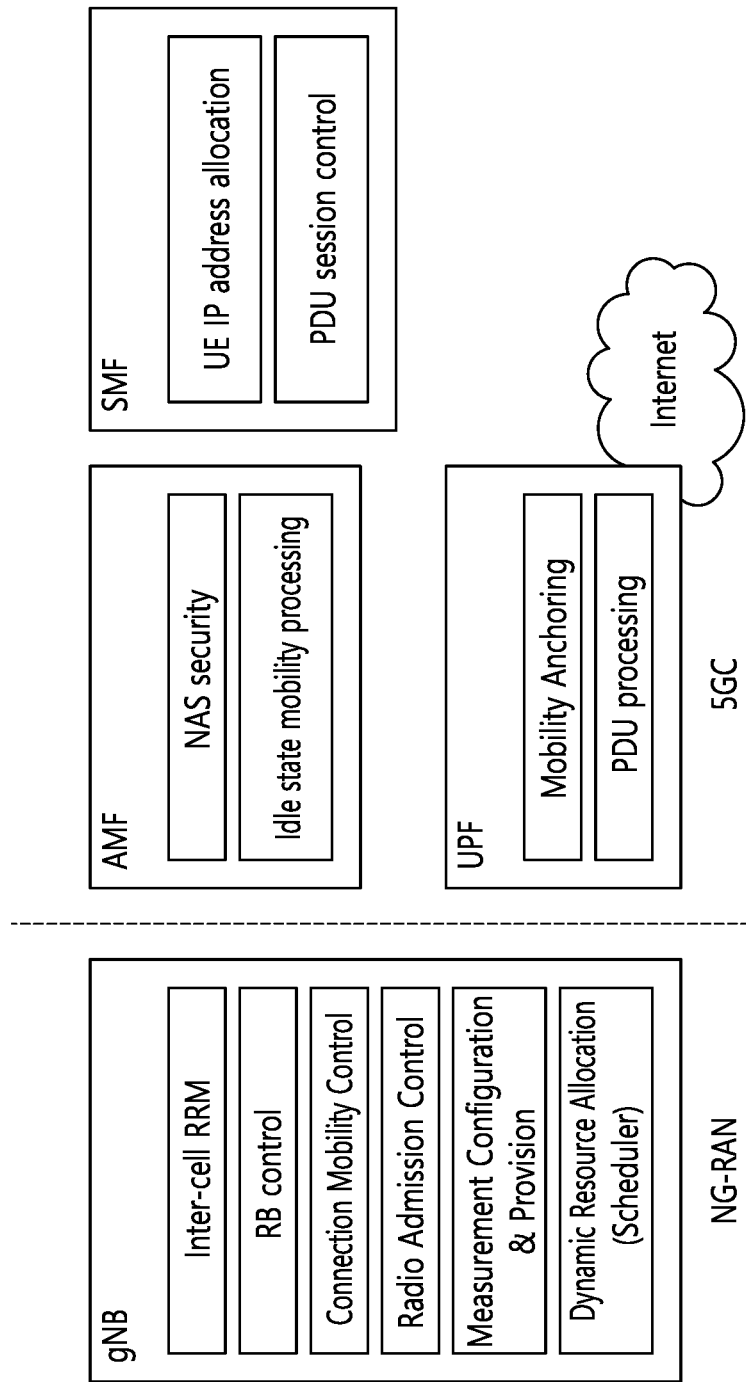

The IE *SystemInformationBlockType21* contains V2X sidelink communication configuration.

*SystemInformationBlockType21* information element

```
-- ASN1START

SystemInformationBlockType21-r14 ::= SEQUENCE {
    sl-V2X-ConfigCommon-r14                SL-V2X-ConfigCommon-r14        OPTIONAL,  -- Need OR
    lateNonCriticalExtension               OCTET STRING                   OPTIONAL,
    ...
}

SL-V2X-ConfigCommon-r14 ::=    SEQUENCE {
    v2x-CommRxPool-r14                     SL-CommRxPoolListV2X-r14
    v2x-CommTxPoolNormalCommon-r14         SL-CommTxPoolListV2X-r14                       OPTIONAL,  -- Need OR
    v2x-CommTxPoolExceptional-r14          SL-CommResourcePoolV2X-r14                     OPTIONAL,  -- Need OR
    v2x-SyncConfig-r14                     SL-SyncConfigListV2X-r14                       OPTIONAL,  -- Need OR
    v2x-InterFreqInfoList-r14              SL-InterFreqInfoListV2X-r14                    OPTIONAL,  -- Need OR
    v2x-ResourceSelectionConfig-r14        SL-CommTxPoolSensingConfig-r14   OPTIONAL,  -- Need OR
    zoneConfig-r14                         SL-ZoneConfig-r14                              OPTIONAL,  -- Need OR
}

SL-CommTxPoolSensingConfig-r14 ::=     SEQUENCE {
    pssch-TxConfigList-r14                 SL-PSSCH-TxConfigList-r14,
    thresPSSCH-RSRP-List-r14               SL-ThresPSSCH-RSRP-List-r14,
    restrictResourceReservationPeriod-r14  SL-RestrictResourceReservationPeriodList-r14   OPTIONAL, -- Need OR
    probResourceKeep-r14                   ENUMERATED {v0, v0dot2, v0dot4, v0dot6, v0dot8,
                                                       spare3,spare2, spare1}
}

-- ASN1STOP
```

FIG. 13

| SystemInformationBlockType21 field descriptions |
|---|
| probResourceKeep<br>Indicates the probability with which the UE keeps the current resource when the resource reselection counter reaches zero for sensing based UE autonomous resource selection (see TS 36.321 [6]). |
| pssch-TxConfigList<br>Indicates PSSCH TX parameters such as MCS, PRB number, retransmission number,<br>associated to different UE absolute speeds and different synchronization reference types<br>for UE autonomous resource selection (see TS 36.213 [23]). |
| restrictResourceReservationPeriod<br>Indicates which values are allowed for the signaling of the resource reservation period in PSCCH. |
| thresPSSCH-RSRP-List<br>Indicates a list of 64 thresholds, and the threshold should be selected based on the priority in the decoded SCI and the priority in the SCI to be transmitted (see TS 36.213 [23]). A resource is excluded if it is indicated or reserved by a decoded SCI and PSSCH RSRP in the associated data resource is above a threshold. |
| v2x-CommRxPool<br>Indicates the resources by which the UE is allowed to receive V2X sidelink communication while in RRC_IDLE and in RRC_CONNECTED. |
| v2x-CommTxPoolExceptional<br>Indicates the resources by which the UE is allowed to transmit V2X sidelink communication in exceptional conditions, as specified in 5.10.13. |
| v2x-CommTxPoolNormalCommon<br>Indicates the resources by which the UE is allowed to transmit non-P2X related V2X sidelink communication when in RRC_IDLE or when in RRC_CONNECTED while transmitting V2X sidelink communication via a frequency other than the primary. E-UTRAN configures one resource pool per zone. |
| v2x-InterFreqInfoList<br>Indicates synchronization and resource allocation configurations of neighboring frequencies<br>for V2X sidelink communication. |
| v2x-ResourceSelectionConfig<br>Indicates V2X sidelink communication configurations used for UE autonomous resource selection. |
| v2x-SyncConfig<br>Indicates the configuration by which the UE is allowed to receive and transmit synchronisation information for V2X sidelink communication. E-UTRAN configures v2x-SyncConfig including txParameters when configuring UEs to transmit synchronisation information. |
| zoneConfig<br>Indicates zone configurations used for V2X sidelink communication in 5.10.13.2. |

FIG. 14

The IE *SL-BWP-PoolConfig* is used to configure NR sidelink communication resource pool.

SL-BWP-PoolConfig information element

```
-- ASN1START
-- TAG-SL-BWP-POOLCONFIG-START

SL-BWP-PoolConfig-r16 ::=        SEQUENCE {
    sl-RxPool-r16                    SEQUENCE (SIZE (1..maxNrofRXPool-r16)) OF SL-ResourcePool-r16      OPTIONAL,   -- Cond HO
    sl-TxPoolSelectedNormal-r16      SL-TxPoolDedicated-r16                                              OPTIONAL,   -- Need M
    sl-TxPoolScheduling-r16          SL-TxPoolDedicated-r16                                              OPTIONAL,   -- Need N
    -- Editor Note: The support of multiple sl-TxPoolScheduling is to be confirmed by RAN1 new agreement.
    sl-TxPoolExceptional-r16         SL-ResourcePoolConfig-r16                                           OPTIONAL    -- Need M
}

SL-TxPoolDedicated-r16 ::=       SEQUENCE {
    sl-PoolToReleaseList-r16         SEQUENCE (SIZE (1..maxNrofTXPool-r16)) OF SL-ResourcePoolID-r16     OPTIONAL,   -- Need N
    sl-PoolToAddModList-r16          SEQUENCE (SIZE (1..maxNrofTXPool-r16)) OF SL-ResourcePoolConfig-r16 OPTIONAL    -- Need N
}

SL-ResourcePoolConfig-r16 ::=    SEQUENCE {
    sl-ResourcePoolID-r16            SL-ResourcePoolID-r16
    sl-ResourcePool-r16              SL-ResourcePool-r16                                                 OPTIONAL,   -- Need M
}                                                                                                       OPTIONAL    -- Need M SL-ResourcePoolID-r16 ::=        INTEGER (1..maxNrofPoolID-r16)

-- TAG-SL-BWP-POOLCONFIG-STOP
-- ASN1STOP
af2
```

| SL-BWP-PoolConfig field descriptions |
|---|
| sl-RxPool<br>Indicates the receiving resource pool on the configured BWP. |
| sl-TxPoolExceptional<br>Indicates the resources by which the UE is allowed to transmit NR sidelink communication in exceptional conditions on the configured BWP. |
| sl-TxPoolScheduling<br>Indicates the resources by which the UE is allowed to transmit NR sidelink communication based on network scheduling on the configured BWP. |
| sl-TxPoolSelectedNormal<br>Indicates the resources by which the UE is allowed to transmit NR sidelink communication by UE autonomous resource selection on the configured BWP. |

METHOD AND APPARATUS FOR PERFORMING RESOURCE POOL-BASED SIDELINK COMMUNICATION IN NR V2X

CROSS-REFERENCE TO RELATED APPLICATIONS

This application is the National Stage filing under 35 U.S.C. § 371 of International Application No. PCT/KR2020/008873, filed on Jul. 8, 2020, which claims the benefit of U.S. Provisional Application No. 62/910,419, filed on Oct. 3, 2019, Korean Application No. 10-2019-0103955, filed on Aug. 23, 2019, and Korean Application No. 10-2020-0017664, filed on Feb. 13, 20202, all of which are incorporated by reference in their entirety herein.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

The present disclosure provides a method for communication between devices (or UEs) based on V2X communication, and device(s) (or UE(s)) performing the method.

Another technical problem of the present disclosure is to provide a method for performing sidelink communication based on a resource pool in NR V2X and an apparatus (or UE) for performing the same.

Technical Solutions

According to an embodiment of the present disclosure, a method for performing, by a first apparatus, sidelink communication may be proposed. The method may comprise: transmitting a first transport block to a second apparatus on a resource allocated by a first sidelink (SL) grant received from a base station; transmitting a system information request message requesting system information to the base station; transmitting a second transport block to the second apparatus on an exceptional resource pool based on that the system information request message is transmitted to the base station; and receiving first system information related to the system information request message, from the base station.

According to an embodiment of the present disclosure, a first apparatus for performing sidelink communication may be proposed. The first apparatus may comprise: one or more memories storing instructions; one or more transceivers; and one or more processors connected to the one or more memories and the one or more transceivers, wherein the one or more processors execute the instructions to: transmit a first transport block to a second apparatus on a resource allocated by a first sidelink (SL) grant received from a base station; transmit a system information request message requesting system information to the base station; transmit a second transport block to the second apparatus on an exceptional resource pool based on that the system information request message is transmitted to the base station; and receive first system information related to the system information request message, from the base station.

According to an embodiment of the present disclosure, an apparatus (of a chip(set)) configured to control a first user equipment (UE) may be proposed. The apparatus may comprise: one or more processors; and one or more memories operably connectable to the one or more processors and storing instructions, wherein the one or more processors execute the instructions to: transmit a first transport block to a second UE on a resource allocated by a first sidelink (SL) grant received from a base station; transmit a system information request message requesting system information to the base station; transmit a second transport block to the second UE on an exceptional resource pool based on that the system information request message is transmitted to the base station; and receive first system information related to the system information request message, from the base station.

According to an embodiment of the present disclosure, a non-transitory computer-readable storage medium storing instructions (or indications) may be proposed. The instructions, when executed, may cause a first apparatus to: transmit a first transport block to a second apparatus on a resource allocated by a first sidelink (SL) grant received from a base station; transmit a system information request message requesting system information to the base station; transmit a second transport block to the second apparatus on an exceptional resource pool based on that the system information request message is transmitted to the base station; and receive first system information related to the system information request message, from the base station.

According to an embodiment of the present disclosure, a method for performing, by a second apparatus, sidelink communication may be proposed. The method may comprise: receiving a first transport block from a first apparatus on a resource allocated by a sidelink (SL) grant the first apparatus received from a base station; and receiving a second transport block from the first apparatus on an exceptional resource pool, wherein the second transport block is transmitted from the first apparatus on the exceptional resource pool based on that the first apparatus transmits a system information request message requesting system information to the base station.

According to an embodiment of the present disclosure, a second apparatus for performing sidelink communication may be proposed. The second apparatus may comprise: one or more memories storing instructions; one or more transceivers; and one or more processors connected to the one or more memories and the one or more transceivers, wherein the one or more processors execute the instructions to: receive a first transport block from a first apparatus on a resource allocated by a sidelink (SL) grant the first apparatus received from a base station; and receive a second transport block from the first apparatus on an exceptional resource pool, wherein the second transport block is transmitted from the first apparatus on the exceptional resource pool based on that the first apparatus transmits a system information request message requesting system information to the base station.

Effects of the Disclosure

According to the present disclosure, sidelink communication between devices (or UEs) can be efficiently performed.

BRIEF DESCRIPTION OF THE DRAWINGS

FIG. 3 shows a functional division between an NG-RAN and a 5GC, based on an embodiment of the present disclosure.

FIG. 12 and FIG. 13 show information related to system information block. The embodiment of FIG. 12 and FIG. 13 may be combined with various embodiment of the present disclosure.

FIG. 14 shows information related to SL BWP pool (e.g., resource pool) configuration. The embodiment of FIG. 14 may be combined with various embodiments of the present disclosure.

Figure 1:
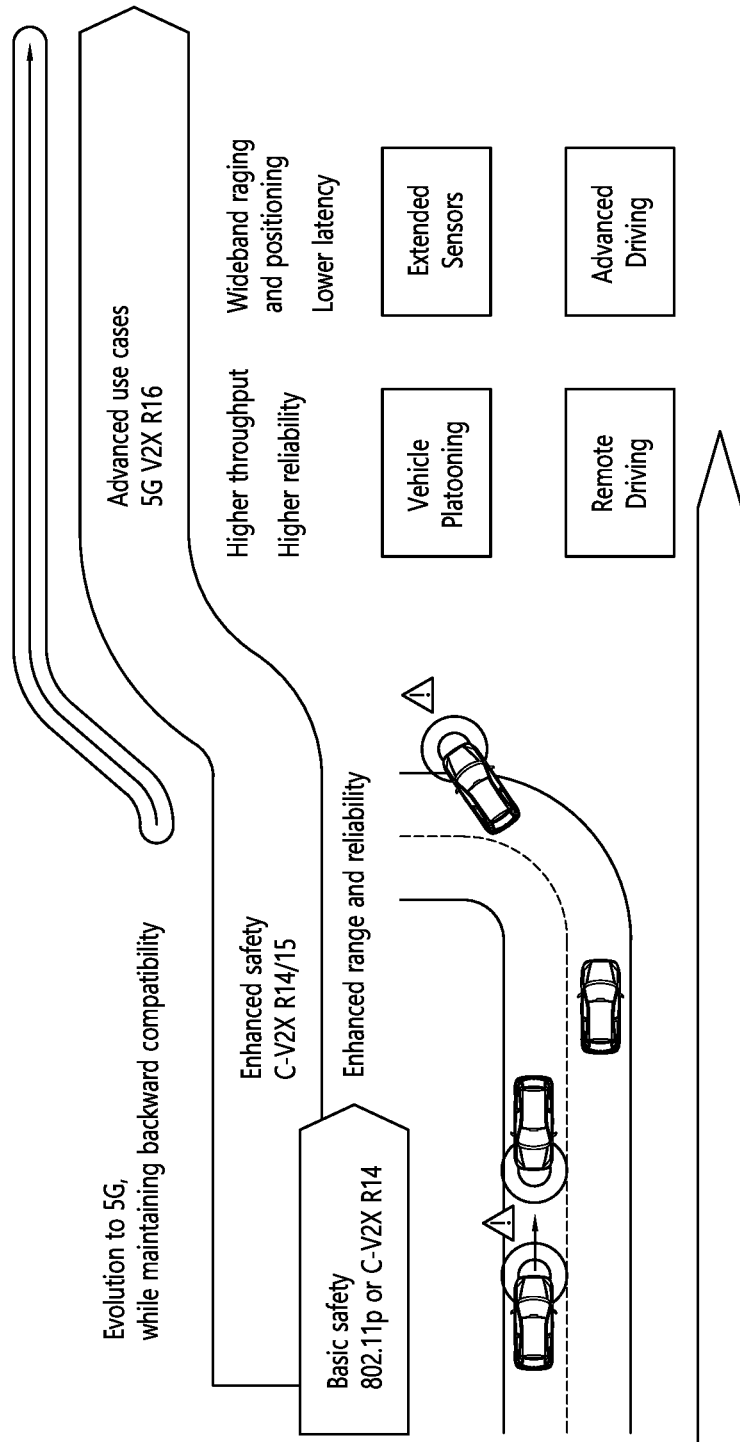
FIG. 1 is a drawing for describing V2X communication based on NR, compared to V2X communication based on RAT used before NR.

DESCRIPTION OF EXEMPLARY
EMBODIMENTS

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
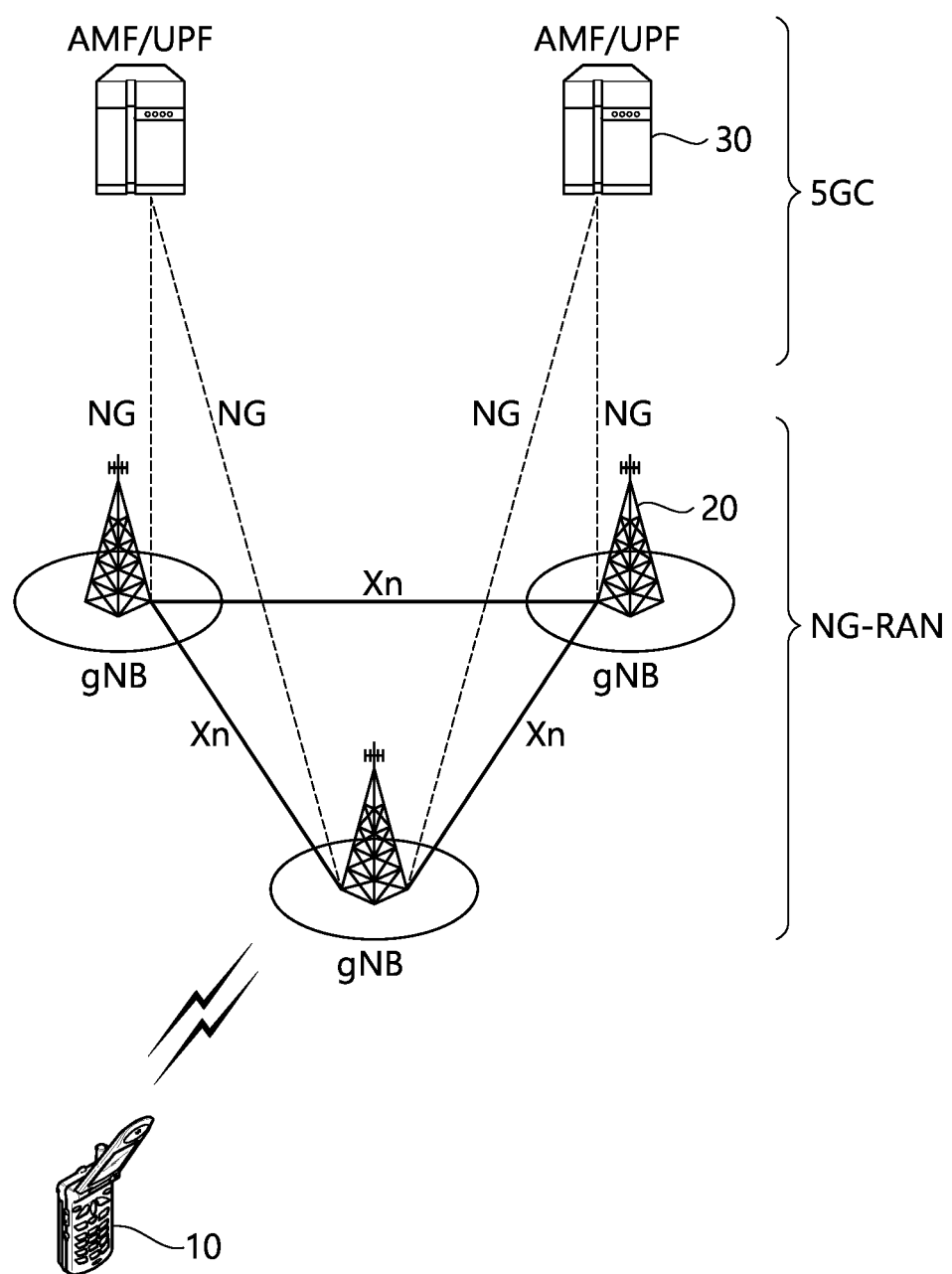
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4A:
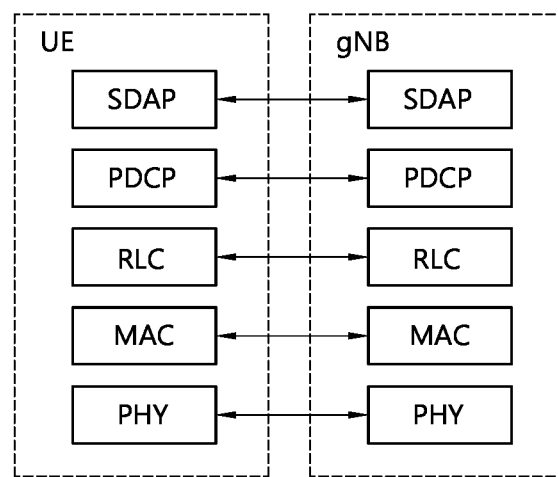
FIGS. 4A and 4B show a radio protocol architecture, based on an embodiment of the present disclosure.
Figure 4B:
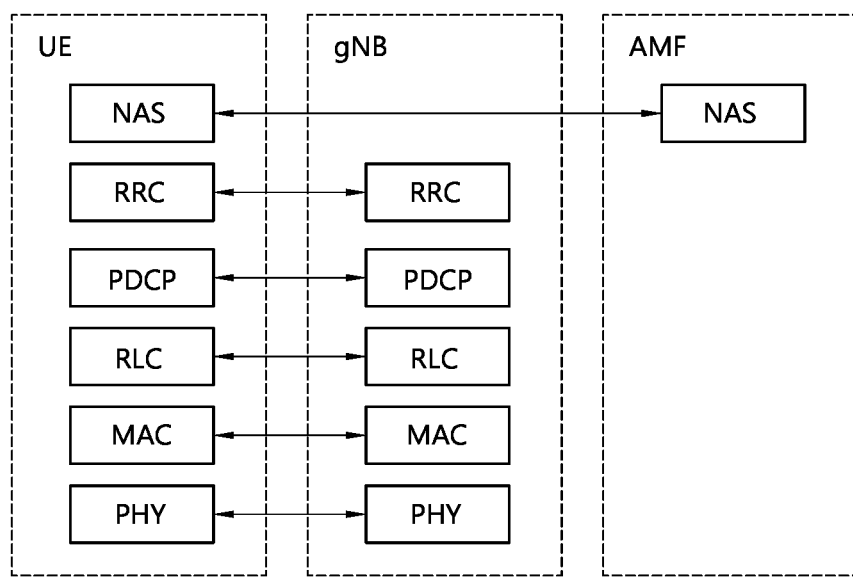

FIGS. 4A and 4B show a radio protocol architecture, based on an embodiment of the present disclosure. The embodiment of FIGS. 4A and 4B may be combined with various embodiments of the present disclosure. Specifically, FIG. 4A shows a radio protocol architecture for a user plane, and FIG. 4B shows a radio protocol architecture for a control plane. The user plane corresponds to a protocol stack for user data transmission, and the control plane corresponds to a protocol stack for control signal transmission.

Referring to FIGS. 4A and 4B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
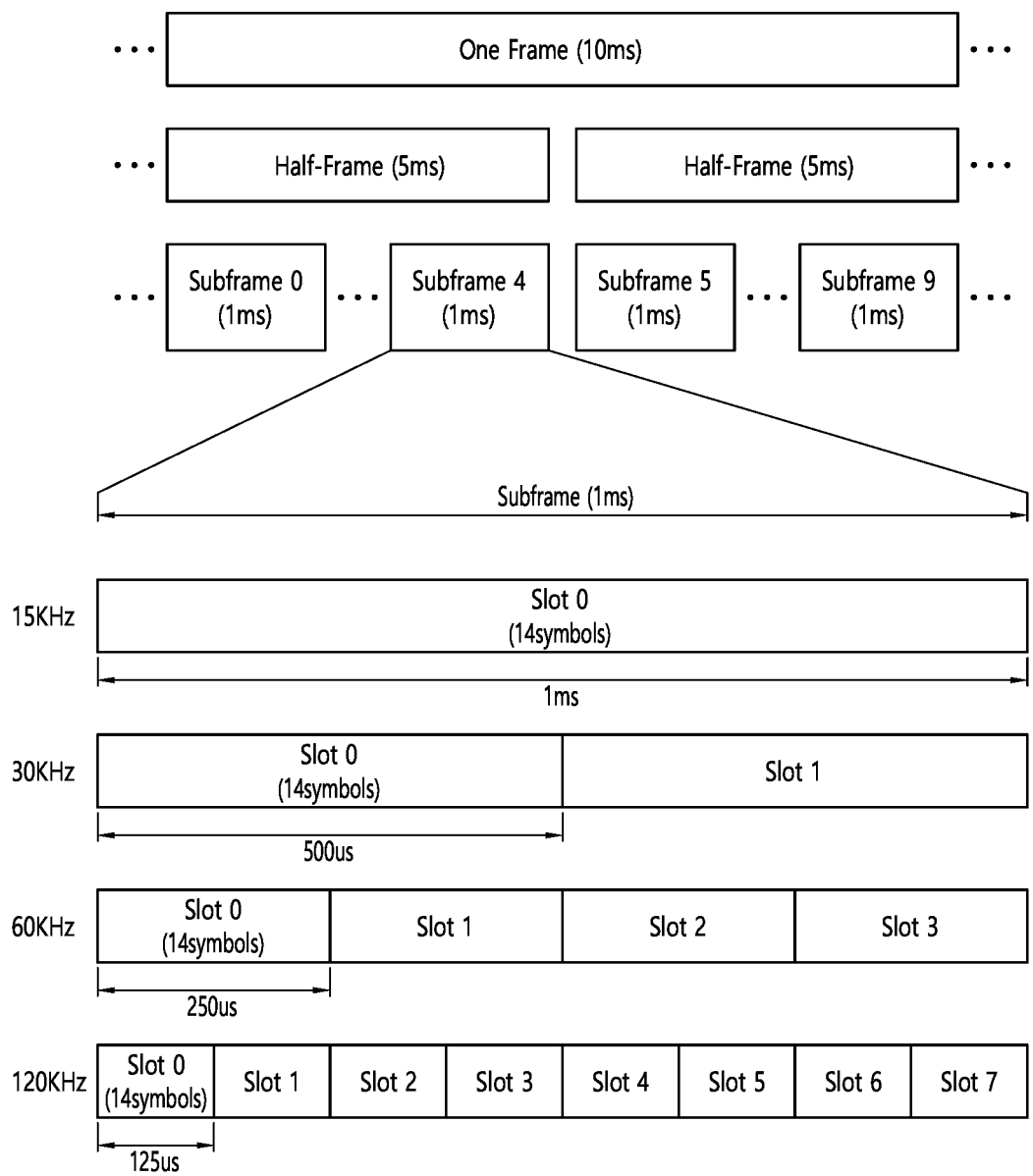
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier- FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

FIG. shows a structure of a slot of an NR frame, based on an embodiment of the present disclosure. The embodiment of FIG. 6 may be combined with various embodiments of the present disclosure.

Figure 6:
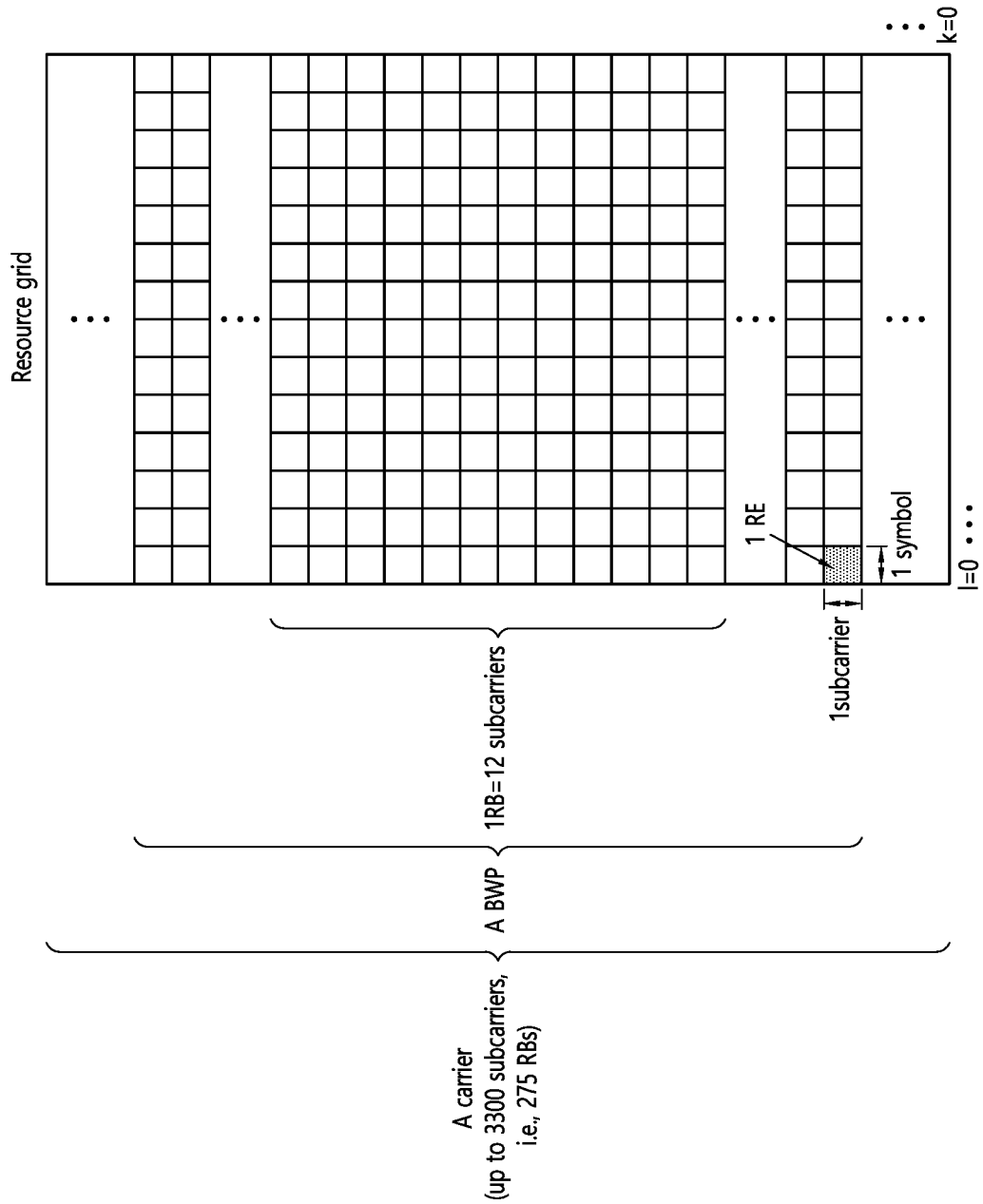
FIG. 6 shows a structure of a slot of an NR frame, based on an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
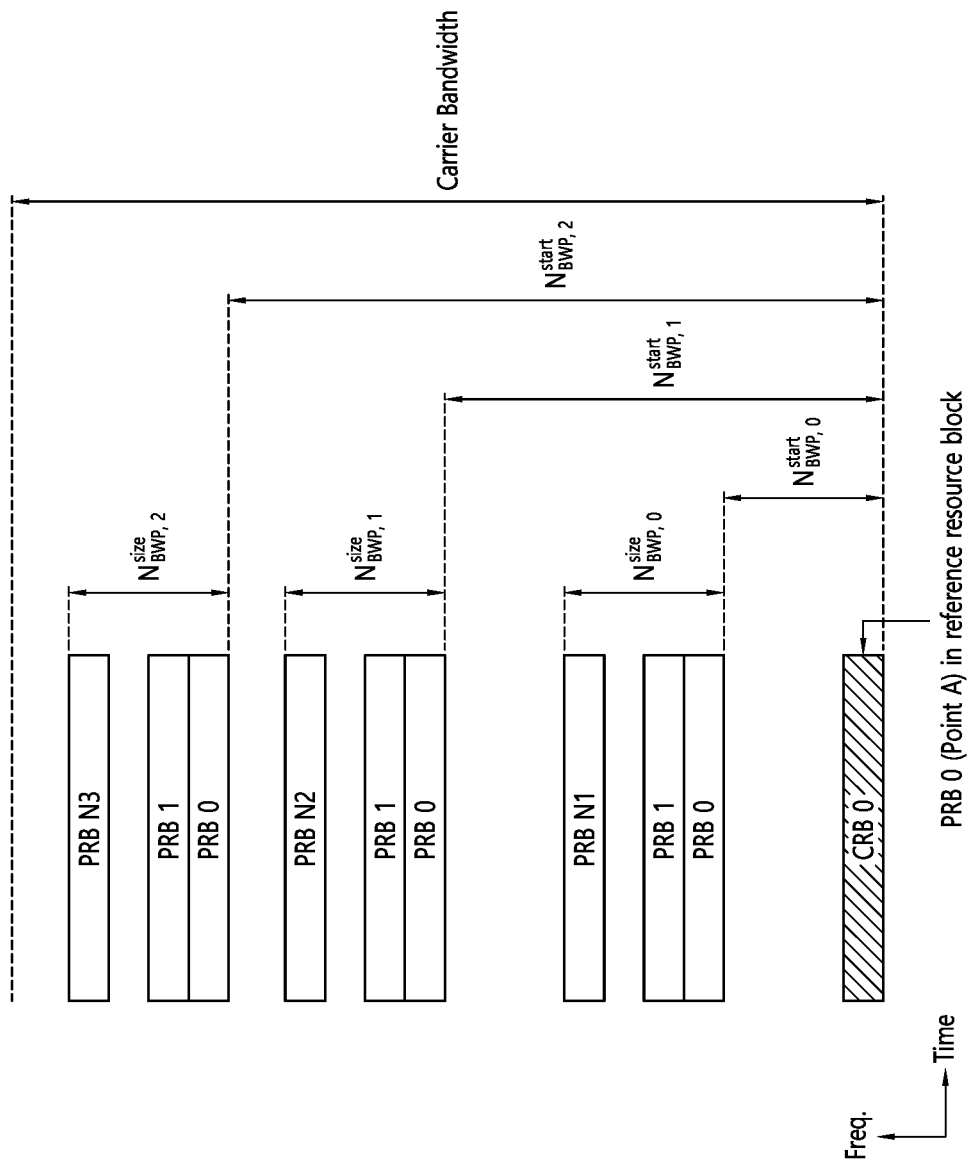
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8A:
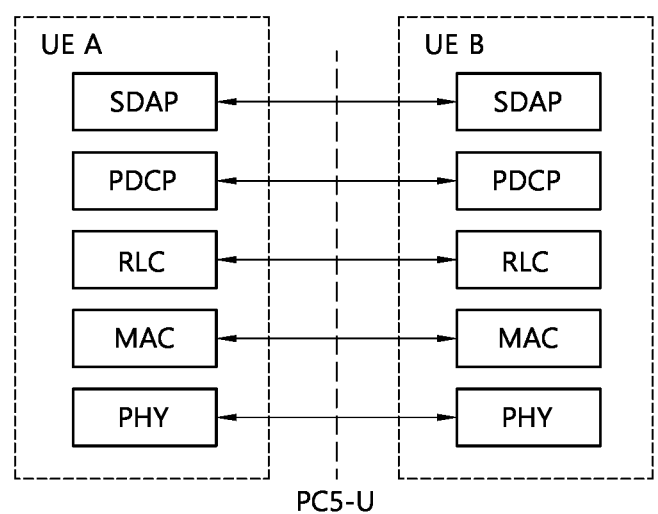
FIGS. 8A and 8B show a radio protocol architecture for a SL communication, based on an embodiment of the present disclosure.
Figure 8B:
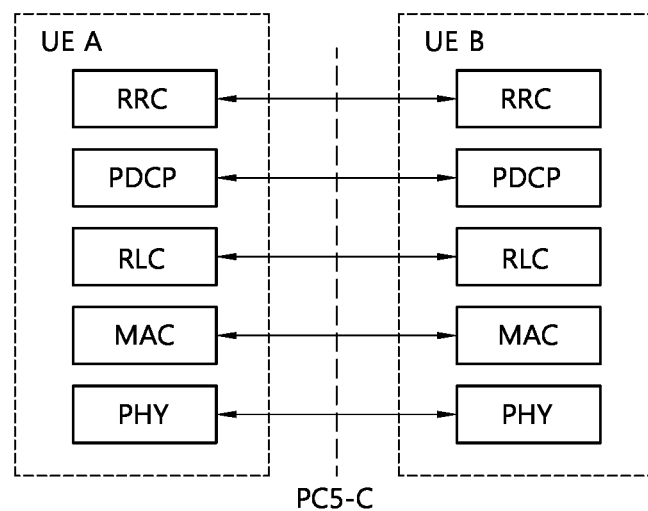

FIGS. 8A and 8B show a radio protocol architecture for a SL communication, based on an embodiment of the present disclosure. The embodiment of FIGS. 8A and 8B may be combined with various embodiments of the present disclosure. More specifically, FIG. 8A shows a user plane protocol stack, and FIG. 8B shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
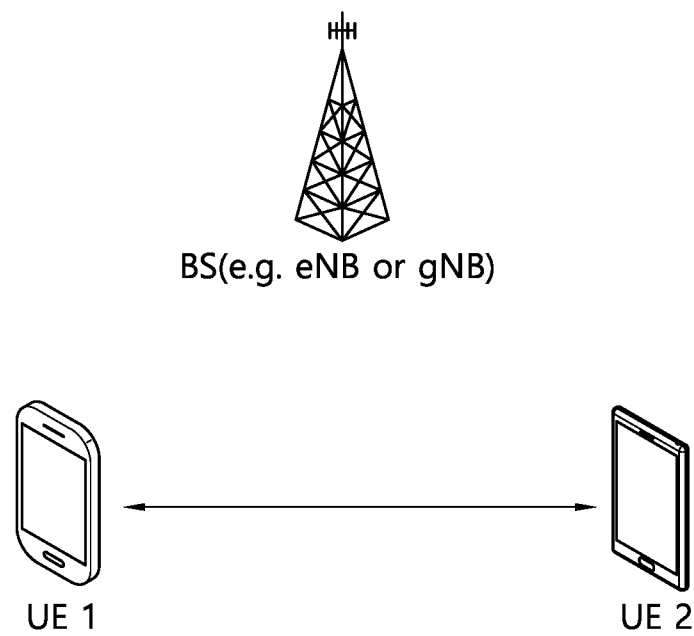
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10A:
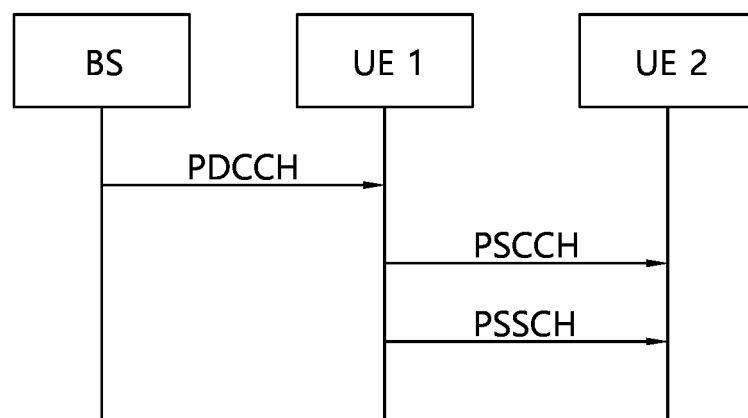
FIGS. 10A and 10B show a procedure of performing V2X or SL communication by a UE based on a transmission mode, based on an embodiment of the present disclosure.
Figure 10B:
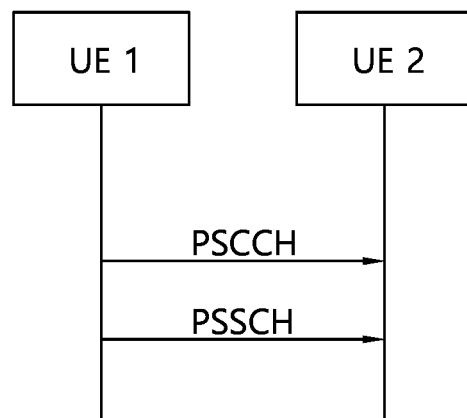

FIGS. 10A and 10B show a procedure of performing V2X or SL communication by a UE based on a transmission mode, based on an embodiment of the present disclosure. The embodiment of FIGS. 10A and 10B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10A shows a UE operation related to an LTE transmission mode 1 or an LTE transmission mode 3. Alternatively, for example, FIG. 10A shows a UE operation related to an NR resource allocation mode 1. For example, the LTE transmission mode 1 may be applied to general SL communication, and the LTE transmission mode 3 may be applied to V2X communication.

For example, FIG. 10B shows a UE operation related to an LTE transmission mode 2 or an LTE transmission mode 4. Alternatively, for example, FIG. 10B shows a UE operation related to an NR resource allocation mode 2.

Referring to FIG. 10A, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11A:
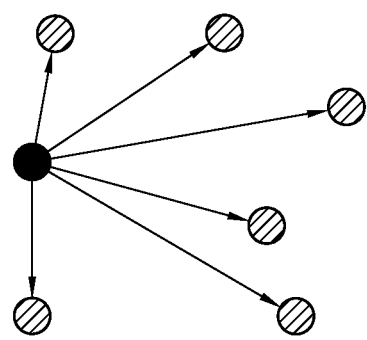
FIGS. 11A to 11C show three cast types, based on an embodiment of the present disclosure.
Figure 11B:
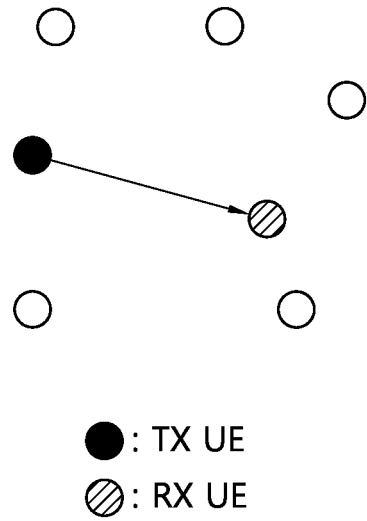
Figure 11C:
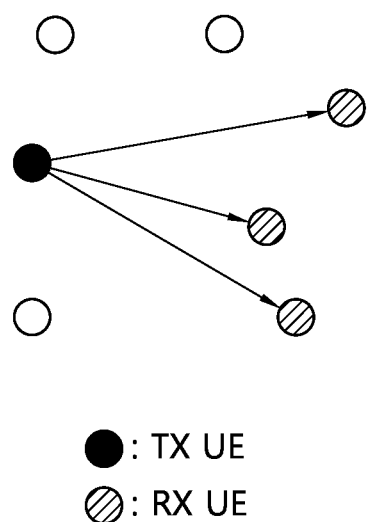

FIGS. 11A to 11C show three cast types, based on an embodiment of the present disclosure. The embodiment of FIGS. 11A to 11C may be combined with various embodiments of the present disclosure. Specifically, FIG. 11A shows broadcast-type SL communication, FIG. 11B shows unicast type-SL communication, and FIG. 11C shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in SL communication, a UE needs to efficiently select resource(s) for SL transmission. Hereinafter, based on various embodiments of the present disclosure, a method for a UE to efficiently select resource(s) for SL transmission and an apparatus supporting the same will be described. In various embodiments of the present disclosure, SL communication may include V2X communication.

At least one of the methods that are proposed based on the various embodiments of the present disclosure may be applied to at least one of unicast communication, groupcast communication, and/or broadcast communication.

At least one of the methods that are proposed based on the various embodiments of the present disclosure may be applied not only to PC5 interface or SL interface (e.g., PSCCH, PSSCH, PSBCH, PSSS/SSSS, and so on) based SL communication or V2X communication but also to Uu interface (e.g., PUSCH, PDSCH, PDCCH, PUCCH, and so on) based SL communication or V2X communication.

In the various embodiments of the present disclosure, receiving operation(s) (or action(s)) of the UE may include decoding operation(s) and/or receiving operation(s) of SL channel(s) and/or SL signal(s) (e.g., PSCCH, PSSCH, PSFCH, PSBCH, PSSS/SSSS, and so on). Receiving operation(s) of the UE may include decoding operation(s) and/or receiving operation(s) of WAN DL channel(s) and/or WAN DL signal(s) (e.g., PDCCH, PDSCH, PSS/SSS, and so on). Receiving operation(s) of the UE may include sensing operation(s) and/or channel busy ratio (CBR) measuring operation(s). In the various embodiments of the present disclosure, Sensing operation(s) of the UE may include PSSCH-RSRP measuring operation(s) based on PSSCH DM-RS sequence(s), PSSCH-RSRP measuring operation(s) based on PSSCH DM-RS sequence(s), which is scheduled by a PSCCH that is successfully decoded by the UE, sidelink RSSI (S-RSSI) measuring operation(s), and/or S-RSSI measuring operation(s) based on subchannel(s) related to V2X resource pool(s). In the various embodiments of the present disclosure, transmitting operation(s) of the UE may include transmitting operation(s) of SL channel(s) and/or SL signal(s) (e.g., PSCCH, PSSCH, PSFCH, PSBCH, PSSS/SSSS, and so on). Transmitting operation(s) may include transmitting operation(s) of WAN UL channel(s) and/or WAN UL signal(s) (e.g., PUSCH, PUCCH, SRS, and so on). In the various embodiments of the present disclosure, a synchronization signal may include an SLSS and/or a PSBCH.

In the various embodiments of the present disclosure, configuration may include signaling, signaling from a network, configuration from a network, and/or a pre-configuration from a network. In the various embodiments of the present disclosure, definition may include signaling, signaling from a network, configuration from a network, and/or a pre-configuration from a network. In the various embodiments of the present disclosure, designation may include signaling, signaling from a network, configuration from a network, and/or a pre-configuration from a network.

In the various embodiments of the present disclosure, ProSe Per Packet Priority (PPPP) may be replaced with ProSe Per Packet Reliability (PPPR), and PPPR may be replaced with PPPP. For example, as the PPPP value becomes smaller, this may indicate a high priority, and, as the PPPP value becomes greater, this may indicate a low priority. For example, as the PPPR value becomes smaller, this may indicate a high reliability, and, as the PPPR value becomes greater, this may indicate a low reliability. For example, a PPPP value related to a service, a packet or a message being related to a high priority may be smaller than a PPPP value related to a service, a packet or a message being related to a low priority. For example, a PPPR value related to a service, a packet or a message being related to a high reliability may be smaller than a PPPR value related to a service, a packet or a message being related to a low reliability.

In the various embodiments of the present disclosure, a session may include at least one of a unicast session (e.g., a unicast session for SL), a groupcast/multicast session (e.g., a groupcast/multicast session for SL), and/or a broadcast session (e.g., a broadcast session for SL).

In the various embodiments of the present disclosure, a carrier may be replaced with at least one of a BWP and/or a resource pool, or vice versa. For example, a carrier may include at least one of a BWP and/or a resource pool. For example, a carrier may include one or more BWPs. For example, a BWP may include one or more resource pools.

Figure 15:
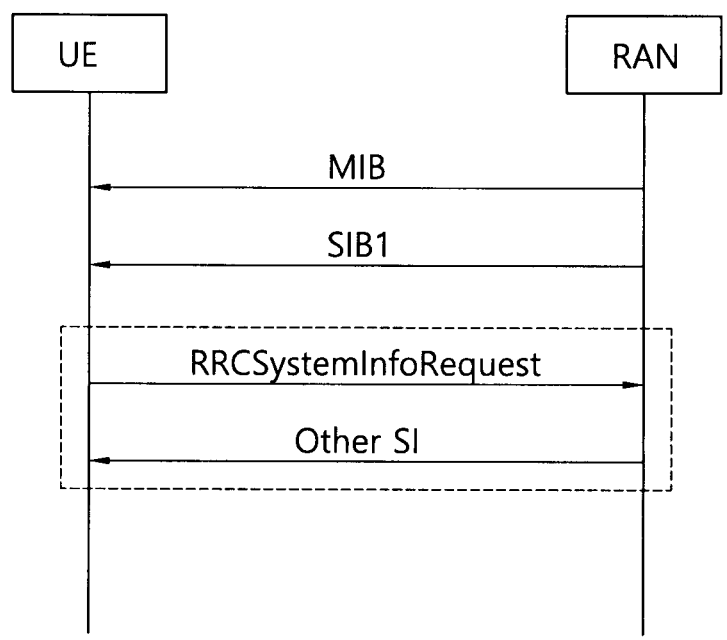
FIG. 15 shows an example of a process for requesting on-demand system information.

FIG. 15 shows an example of a process for requesting on-demand system information.

In NR sidelink (SL), there is a discussion about NR system information as shown in the example of Table 5 below.

TABLE 5

[3GPP RAN2#105bis:] Agreements on validity area mechanism to SL:
1: NR SIB validity mechanism is reused to enable validity area for SL resource pool configured via broadcasted system information
[3GPP RAN2#106:]Agreements on SL configurations:
1: For idle/inactive UE, NR V2X SI can be provided on-demand. It is a network decision whether the NR V2X SI is broadcast at a given time. FFS for connected UE.

In Table 5, on-demand system information (SI) is a feature newly introduced in NR, for the purpose of saving radio resources in NR, some SIs may be used when not broadcasting. In this case, a UE may request desired SI from a base station through a random access procedure. More specifically, the SI request method may include, for example, an Msg1-based SI request and an Msg3-based SI request method. FIG. 15 shows an on-demand SI request process of NR.

Similarly, in NR SL, SI must be obtained from a base station, as shown in Table 5 above, an idle/inactive UE may request SI desired by the UE on-demand. In the present disclosure, it is proposed that on-demand SI is also possible in the connected mode, and in this case, a method for solving the problem of delay in communication between SLs due to a delay occurring while a UE obtains SI information is proposed.

An on-demand SI function may be introduced for inactive, idle UEs, in order to reduce a signaling overhead for broadcasting for the minimum SI (e.g., various broadcast messages including initial access and other SI (other SI (OSI)) messages) between a UE and a base station. On the other hand, in a use case such as NR positioning, a dedicated signaling approach for enabling a connected UE to receive SI is being discussed.

On the other hand, even in NR SL, a connected UE operating in mode 1 may request desired SI information from a base station, and a base station may transmit SI to a UE through dedicated signaling at the base station's determination. At this time, a message requested by a UE from a base station was in a form of a random access message in deactivated and idle mode, a connected UE may perform a request through a predefined grant (e.g., dedicated UL DCCH, such as PUCCH or PUSCH), and transmission for SI may be performed through RRC signaling. When this operation is introduced to an NR SL mode 1 UE, SL communication delay may occur, if a new packet transmission is required while a UE operating in mode 1 connected mode requests on-demand SI and receives desired SI. As an example, there may be the following cases, and solutions accordingly are also presented below.

In one embodiment, a case in which a mode 1 UE performing dynamic scheduling mode SL transmission performs on-demand SI request/obtainment may be considered. Assume that an SL mode 1 UE is performing SL transmission by being allocated resources from a base station through dynamic scheduling. At this time, by performing an on-demand SI request, a delay may occur in the process of requesting a resource grant from a base station (e.g., SR/BSR process for SL grant) in order to transmit a packet to be newly transmitted (or retransmitted). Due to such a delay, a problem may occur in which a latency requirement of a packet to be transmitted cannot be satisfied.

In another embodiment, there may be a problem in that SL communication is delayed because the desired SI is not received, since there is an (excessive) delay between an RRC-connected UE requesting on-demand SI and receiving the desired SI. That is, a UE may not be able to configure its own general parameters because it does not receive SI from a base station.

In another embodiment, a UE leaves an RRC_CONNECTED state, and the UE may request on-demand SI for SI obtainment from another new cell in order to acquire new SI. Alternatively, even if a UE does not leave an RRC_CONNECTED state, the UE may attempt handover to another cell or request on-demand SI to acquire SI for another cell according to moving. If the new cell is in the same validity area, there is no need to request on-demand SI, but if the new cell is in a different validity area than before, it is necessary to request on-demand SI. Accordingly, a UE may request on-demand SI to obtain new SI to a cell having a different validity area.

In an embodiment, in order to solve the problem according to some of the above embodiments, a mode 1 connected UE may perform resource transmission in order to prevent existing sidelink delay through a predefined resource pool (e.g., an exceptional resource pool), while performing on-demand SI request/obtainment. Here, a UE selects a new cell and performs SL transmission using an exceptional resource pool until receiving new SI, in this case, a UE may temporarily perform SL transmission using SL pre-configuration (for example, it may include related QoS parameters, flow-bearer mapping, RLC, PDCP parameters, etc.), or perform SL transmission using a pre-defined dedicated configuration to be used before acquiring new SI. This may be used, for example, when a UE moves to a new SI validity area (i.e. before new SI is delivered to a UE).

In another embodiment, in order to solve the problem according to some of the above embodiments, an SL configuration of the previous SI effective area can be temporarily used before new SI is transmitted.

In another embodiment, if a UE is configured to simultaneous mode (e.g., mode 1 and mode 2 simultaneous mode configuration), the UE may perform resource occupancy and data transmission by using a pre-configured Mode 2 normal resource pool.

In another embodiment, if a mode 1 UE receives a configure grant (CG) at the same time, the UE may perform transmission through a previously received CG resource.

The above proposal proposed a method for solving an SL communication delay caused by a delay caused by an NR SL connected UE performing an on-demand SI operation, but it can be similarly used as a method for preventing SL communication delay caused by SL inactive UE and an SL idle UE performing on-demand SI operation. For example, a deactivated, idle UE may perform an operation of transmitting a random access message for SI request and receive desired SI, in this case, when the UE must unavoidably perform mode 1 operation, a delay may occur in receiving a grant from a base station. In this case, at least one of the solutions described above may be used.

According to an embodiment of the present disclosure, a mode 1 UE performing an NR SL operation may prevent delay of SL communication from occurring in the process of requesting/receiving on-demand SI.

Meanwhile, in NR V2X, a resource pool for SL communication of a UE may be defined. Here, for example, when a UE cannot normally use a TX resource pool and/or an RX resource pool due to exceptional circumstances (e.g., radio link failure (RLF), handover, etc.), performance degradation of SL communication may occur. Therefore, in order to prevent performance degradation of SL communication, a base station may configured or pre-configured an exceptional resource pool to a UE. And, when a UE cannot normally use a TX resource pool and/or an RX resource pool, the UE may perform SL communication using an exceptional resource pool. For convenience of description, an exceptional resource pool may be referred to as an exceptional pool, and a normal resource pool may be referred to as a normal pool.

In the existing LTE V2X, a base station may transmit information related to an exceptional pool and/or information related to a normal pool to a UE through System Information Block type 21 (SIB21). For example, FIG. 12 and FIG. 13 show an example of SIB21. For example, for information related to SIB21, 3GPP TS 36.331 V15.8.0 may be referred to.

FIG. 12 and FIG. 13 show information related to system information block. The embodiment of FIG. 12 and FIG. 13 may be combined with various embodiment of the present disclosure.

Referring to FIG. 12 and FIG. 13, SIB21 may include a v2x-CommTxPoolExceptional parameter. A base station may signal a configuration of an exceptional pool to a UE through a v2x-CommTxPoolExceptional parameter. And, referring to the SystemInformationBlockType21 field descriptions, when an exceptional condition is satisfied, a UE that was performing SL transmission using a normal transmission pool may perform SL transmission using an exceptional pool.

Meanwhile, even in NR V2X, an exceptional resource pool may be defined. And, similarly to the above, a UE may receive a configuration related to an exceptional resource pool from a base station. Meanwhile, in NR V2X, a newly defined Band Width Part (BWP). And, since it is stipulated that a resource pool exists in a BWP, a configuration related to an exceptional resource pool may be included in a configuration related to a BWP pool. FIG. 14 shows an example of configurations related to an SL BWP pool.

FIG. 14 shows information related to SL BWP pool (e.g., resource pool) configuration. The embodiment of FIG. 14 may be combined with various embodiments of the present disclosure. Referring to FIG. 14, a configuration related to the SL BWP pool (e.g., SL-BWP-PoolConfig) may include a configuration (e.g., sl-TxPoolExceptional) related to an exceptional resource pool. For example, if a UE within a coverage of a base station is in an RRC_CONNECTED state, the UE may receive a configuration related to an SL BWP pool from a base station through RRC dedicated signaling. Otherwise, a UE may receive a configuration related to an SL BWP pool from a base station through a SIB. Hereinafter, a method for a UE to perform SL communication based on an exceptional resource pool in NR V2X, and an apparatus supporting the same in NR V2X, according to various embodiments of the present disclosure will be described.

Figure 16:
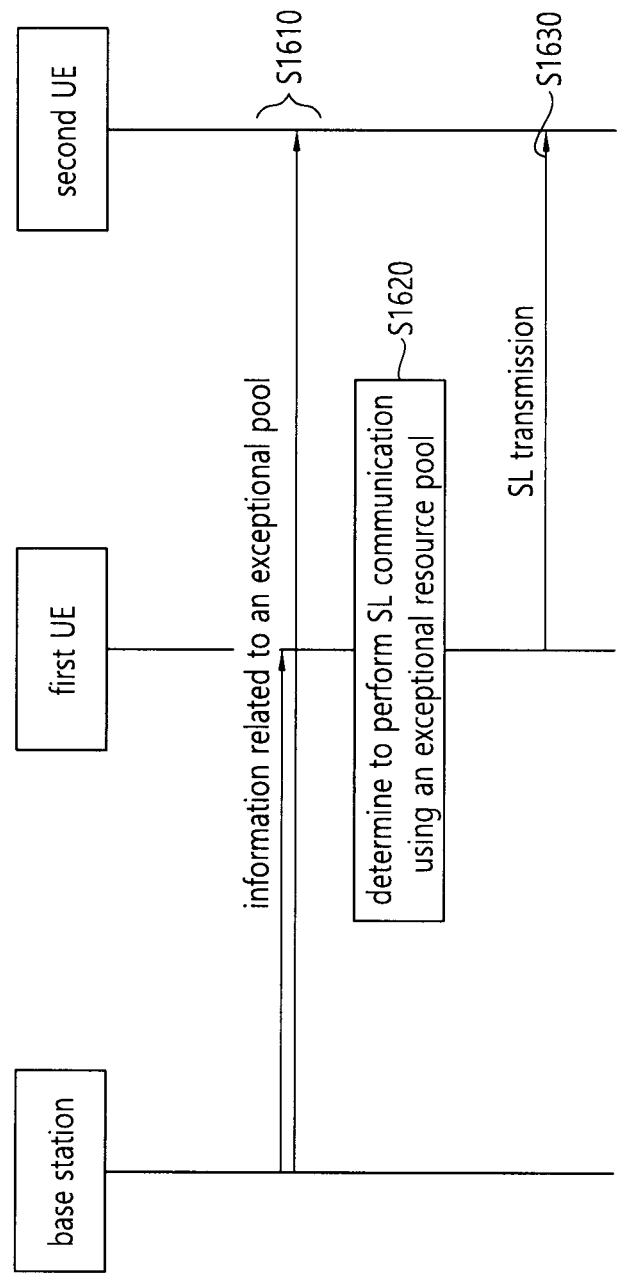
FIG. 16 shows an example of a process of performing sidelink communication based on an exceptional resource pool between a base station, a first UE, and a second UE.

FIG. 16 shows an example of a process of performing sidelink communication based on an exceptional resource pool between a base station, a first UE, and a second UE.

FIG. 16, in step S1610, a base station may transmit information related to an exceptional resource pool to a first UE and/or a second UE. For example, information related to an exceptional resource pool may be included in a configuration related to an SL BWP pool. For example, a configuration related to an SL BWP pool may be defined as shown in FIG. 14. For example, only one exceptional resource pool may exist for one specific cell. And, a UE may share the one exceptional resource pool with other UEs. As described above, when one exceptional resource pool is configured for a UE, the UE can quickly randomly select a resource without selecting a specific exceptional resource pool.

Additionally, in NR V2X, HARQ feedback may be supported between UEs. In order to support HARQ feedback, a UE may need a resource to transmit feedback information (e.g., ACK, NACK). In this case, a channel used by a UE to transmit feedback information may be referred to as a Physical Sidelink Feedback Channel (PSFCH), and a resource used by a UE to transmit feedback information may be referred to as a PSFCH resource. For example, a PSFCH resource for transmission and reception of SL HARQ feedback may be configured for a normal resource pool or may not be configured for a normal resource pool. Similarly, a PSFCH resource for transmission and reception of SL HARQ feedback may be configured for an exceptional resource pool or may not be configured for an exceptional resource pool.

For example, if the PSFCH resource is configured for an exceptional resource pool, a UE may transmit HARQ feedback using the PSFCH resource. In this case, a UE may determine whether to transmit an actual HARQ feedback on an exceptional resource pool according to QoS of a data to be transmitted. Conversely, for example, when a PSFCH resource is not configured for an exceptional resource pool, a UE may not perform HARQ feedback. Here, for example, transmitting a HARQ feedback by a first UE may include transmitting a HARQ feedback to a second UE by the first UE receiving a HARQ enable MAC PDU generated by the second UE. For example, that a first UE does not transmit a HARQ feedback may include that a first UE that has received a HARQ disable MAC PDU generated by a second UE does not transmit a HARQ feedback to the second UE. For example, a HARQ enable MAC PDU may be a MAC PDU requiring HARQ feedback, and a HARQ disable MAC PDU may be a MAC PDU not requiring HARQ feedback. For example, a HARQ enable Logical Channel (LCH) may be an LCH requiring HARQ feedback, and a HARQ disable LCH may be an LCH not requiring HARQ feedback.

According to the current Logical Channel Prioritization (LCP) operation in NR V2X, when a HARQ operation related to a Logical Channel (LCH) of a UE is enabled, the UE cannot transmit a HARQ enable LCH through a resource pool without a PSFCH resource. Alternatively, when a HARQ operation related to a Radio Bearer (RB) related to an LCH of a UE is enabled, the UE cannot transmit a HARQ enable LCH through a resource pool without a PSFCH resource. However, unlike the existing normal resource pool, a UE needs to perform fast transmission/reception through an exceptional resource pool so that communication between two UEs is not cut off in an exceptional situation. Therefore, unlike the existing LCP operation, a UE may need to perform an exceptional operation on an exceptional resource pool.

In step S1620, a first UE may determine to perform SL communication using an exceptional resource pool. For example, a first UE may configure the exceptional resource pool based on information related to the exceptional resource pool. For example, when a specific condition is satisfied, a first UE may decide to perform SL communication using an exceptional resource pool. For example, when RLF between a first UE and a second UE is detected, the first UE may decide to perform SL communication using an exceptional resource pool. The specific condition should not be interpreted limitedly to RLF, and a first UE may decide to perform SL communication using an exceptional resource pool based on various conditions.

In this case, for example, a UE may occupy a resource on an exceptional resource pool. And, in step S1630, a UE may perform SL transmission using the resource. In this case, a UE may exceptionally perform the following LCP operation.

According to an embodiment of the present disclosure, a first UE may trigger resource occupation on an exceptional resource pool. In this case, for example, a first UE can generate a HARQ enable MAC PDU even when a PSFCH resource is not on an exceptional resource pool configured for a first UE and a HARQ operation related to an LCH is enabled, and a first UE may transmit the HARQ enable MAC PDU to a second UE on an exceptional resource pool. Or, for example, a first UE may generate a HARQ enable MAC PDU even when a PSFCH resource is not on an exceptional resource pool configured for a first UE and a HARQ operation related to a Radio Bearer (RB) related to an LCH is enabled, and a first UE may transmit the HARQ enable MAC PDU to a second UE on an exceptional resource pool. Through the above-described operation, a UE may transmit data for which HARQ transmission is requested while giving up a HARQ operation. In other words, when an exceptional resource pool is configured for one UE in a specific cell, and the exceptional resource pool does not include a PSFCH resource, a UE does not transmit a data requesting HARQ, but the UE may exceptionally perform SL transmission in order to satisfy the continuity of the two links even if the UE abandons reception of a HARQ feedback.

According to an embodiment of the present disclosure, a first UE may trigger resource occupation on an exceptional resource pool. In this case, for example, even if a PSFCH resource is on an exceptional resource pool configured for a first UE and a HARQ operation related to an LCH is disabled, the first UE may generate a HARQ disable MAC PDU, the first UE may transmit the HARQ disable MAC PDU to a second UE on an exceptional resource pool. Or, for example, even if a PSFCH resource is on an exceptional resource pool configured for a first UE and a HARQ operation related to a Radio Bearer (RB) related to an LCH is disabled, the first UE may generate a HARQ disable MAC PDU, the first UE may transmit the HARQ disable MAC PDU to a second UE on an exceptional resource pool. Through the above-described operation, even if a UE has one exceptional resource pool configured for the UE in a cell, and the configured exceptional resource pool includes a PSFCH resource, the UE may configure a HARQ disable LCH as a MAC PDU, and the UE may transmit the HARQ disable MAC PDU using an SL resource on the exceptional resource pool.

According to an embodiment of the present disclosure, unlike the current LCP operation, a UE may multiplex data related to HARQ enable LCH and data related to HARQ disable LCH on an exceptional resource pool. That is, for example, according to the current LCP operation, a UE may configure data related to HARQ enable LCH and data related to HARQ disable LCH into different MAC PDUs, respectively. However, on an exceptional resource pool, there may be no restrictions due to HARQ in LCP as an exception. Accordingly, a UE may construct a MAC PDU from data of a LCH by using only a condition based on priority of an LCH. That is, regardless of a HARQ enable or HARQ disable configuration in an LCH having the same destination, a UE sequentially selects and multiplexes data from an LCH having a high priority to an LCH having a low priority. Through the above-described operation, a UE may configure and transmit a MAC PDU.

Figure 17:
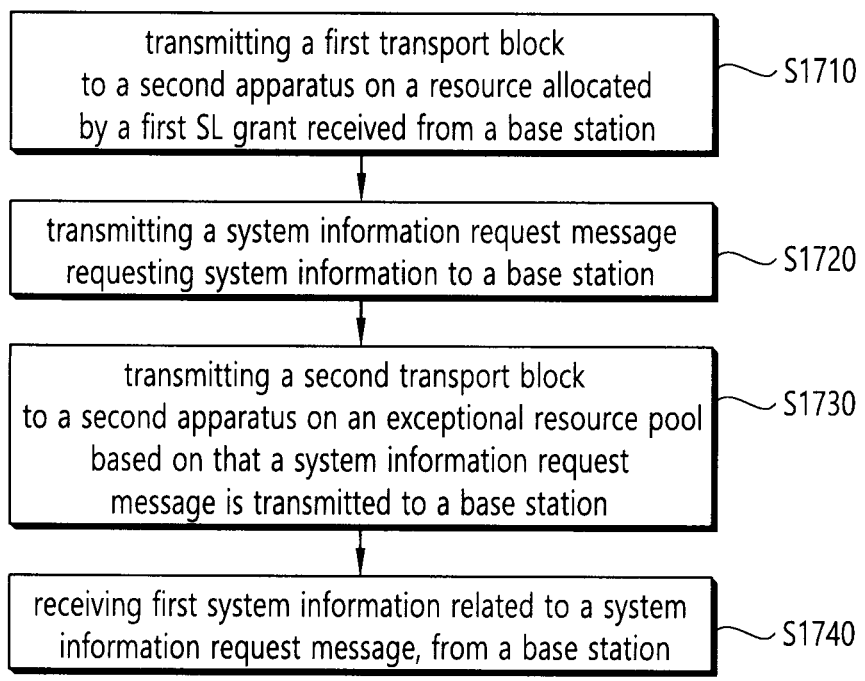
FIG. 17 is a flowchart showing an operation of a first apparatus according to an embodiment of the present disclosure.

FIG. 17 is a flowchart showing an operation of a first apparatus according to an embodiment of the present disclosure.

The operations disclosed in the flowchart of FIG. 17 may be performed in combination with various embodiments of the present disclosure. In one example, operations disclosed in the flowchart of FIG. 17 may be performed based on at least one of devices illustrated in FIGS. 16 to 21. In one example, a first apparatus of FIG. 17 may correspond to a first wireless device 100 of FIG. 20 to be described later. In another example, a first apparatus of FIG. 17 may correspond to a second wireless device 200 of FIG. 20 to be described later.

In step S1710, a first apparatus according to an embodiment may transmit a first transport block to a second apparatus on a resource allocated by a first sidelink (SL) grant received from a base station In step S1720, a first apparatus according to an embodiment may transmit a system information request message requesting system information to the base station.

In step S1730, a first apparatus according to an embodiment may transmit a second transport block to the second apparatus on an exceptional resource pool based on that the system information request message is transmitted to the base station.

In step S1740, a first apparatus according to an embodiment may receive first system information related to the system information request message, from the base station.

In one embodiment, the first apparatus may have a radio resource control (RRC) connection with the base station established.

In one embodiment, the first system information may include an initial access message or a broadcast message.

In one embodiment, a time resource period for the second transport block allocated by a second SL grant related to an SL grant request transmission may exceed a latency requirement of the second transport block, based on that the SL grant request transmission for the transmission of the second transport block is delayed by the transmission of the system information request message.

In one embodiment, the SL grant request transmission may include at least of a scheduling request (SR) or a buffer status report (BSR), for the transmission of the second transport block.

In one embodiment, the exceptional resource pool may be predefined.

A first apparatus according to an embodiment may, in transmitting the second transport block to the second apparatus, transmit the second transport block to the second apparatus on the exceptional resource pool, based on a sidelink pre-configuration. In this case, the sidelink pre-configuration may include at least one of a related quality of service (QoS) parameter configuration, a flow to bearer mapping configuration, a radio link control (RLC) configuration or a packet data convergence protocol (PDCP) parameter configuration.

A first apparatus according to an embodiment may, in transmitting the second transport block to the second apparatus, transmit the second transport block to the second apparatus on the exceptional resource pool, based on a dedicated configuration. In this case, the dedicated configuration may be predefined to apply to a sidelink transmission performed before receiving the first system information.

A first apparatus according to an embodiment may, in transmitting the second transport block to the second apparatus, transmit the second transport block to the second apparatus on the exceptional resource pool, based on a sidelink configuration related to second system information of a previous validity area. In this case, the sidelink configuration related to the second system information may be applied to a sidelink transmission performed before receiving the first system information.

According to an embodiment of the present disclosure, a first apparatus for performing sidelink communication may be proposed. The first apparatus may comprise: one or more memories storing instructions; one or more transceivers; and one or more processors connected to the one or more memories and the one or more transceivers, wherein the one or more processors execute the instructions to: transmit a first transport block to a second apparatus on a resource allocated by a first sidelink (SL) grant received from a base station; transmit a system information request message requesting system information to the base station; transmit a second transport block to the second apparatus on an exceptional resource pool based on that the system information request message is transmitted to the base station; and receive first system information related to the system information request message, from the base station.

According to an embodiment of the present disclosure, an apparatus (of a chip(set)) configured to control a first user equipment (UE) may be proposed. The apparatus may comprise: one or more processors; and one or more memories operably connectable to the one or more processors and storing instructions, wherein the one or more processors execute the instructions to: transmit a first transport block to a second UE on a resource allocated by a first sidelink (SL) grant received from a base station; transmit a system information request message requesting system information to the base station; transmit a second transport block to the second UE on an exceptional resource pool based on that the system information request message is transmitted to the base station; and receive first system information related to the system information request message, from the base station.

In one example, a first UE of the embodiment may refer to a first apparatus described in the first half of the present disclosure. In one example, the at least one processor and the at least one memory in the apparatus for controlling the first UE may be implemented as separate sub-chips, respectively, alternatively, at least two or more components may be implemented through one sub-chip.

According to an embodiment of the present disclosure, a non-transitory computer-readable storage medium storing instructions (or indications) may be proposed. The instructions, when executed, may cause a first apparatus to: transmit a first transport block to a second apparatus on a resource allocated by a first sidelink (SL) grant received from a base station; transmit a system information request message requesting system information to the base station; transmit a second transport block to the second apparatus on an exceptional resource pool based on that the system information request message is transmitted to the base station; and receive first system information related to the system information request message, from the base station.

Figure 18:
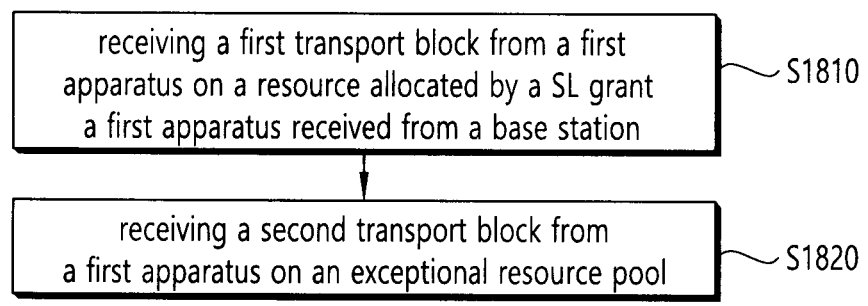
FIG. 18 is a flowchart showing an operation of a second apparatus according to an embodiment of the present disclosure.

FIG. 18 is a flowchart showing an operation of a second apparatus according to an embodiment of the present disclosure.

Operations disclosed in the flowchart of FIG. 18 may be performed in combination with various embodiments of the present disclosure. In one example, operations disclosed in the flowchart of FIG. 18 may be performed based on at least one of devices illustrated in FIGS. 16 to 21. In one example, a second apparatus of FIG. 18 may correspond to a second wireless device 200 of FIG. 20 to be described later. In another example, the second device of FIG. 18 may correspond to the first wireless device 100 of FIG. 20 to be described later.

In step S1810, a second apparatus according to an embodiment may receive a first transport block from a first apparatus on a resource allocated by a sidelink (SL) grant the first apparatus received from a base station.

In step S1820, a second apparatus according to an embodiment may receive a second transport block from the first apparatus on an exceptional resource pool.

In one embodiment, the second transport block may be transmitted from the first apparatus on the exceptional resource pool, based on that the first apparatus transmits a system information request message for requesting system information to the base station.

In one embodiment, the first apparatus may have a radio resource control (RRC) connection with the base station established.

In one embodiment, the first system information may include an initial access message or a broadcast message.

In one embodiment, a time resource period for the second transport block allocated by a second SL grant related to an SL grant request transmission may exceed a latency requirement of the second transport block, based on that the SL grant request transmission for the transmission of the second transport block is delayed by the transmission of the system information request message.

In one embodiment, the SL grant request transmission may include at least of a scheduling request (SR) or a buffer status report (BSR), for the transmission of the second transport block.

In one embodiment, the exceptional resource pool may be predefined.

A first apparatus according to an embodiment may, in transmitting the second transport block to the second apparatus, transmit the second transport block to the second apparatus on the exceptional resource pool, based on a sidelink pre-configuration. In this case, the sidelink pre-configuration may include at least one of a related quality of service (QoS) parameter configuration, a flow to bearer mapping configuration, a radio link control (RLC) configuration or a packet data convergence protocol (PDCP) parameter configuration.

A first apparatus according to an embodiment may, in transmitting the second transport block to the second apparatus, transmit the second transport block to the second apparatus on the exceptional resource pool, based on a dedicated configuration. In this case, the dedicated configuration may be predefined to apply to a sidelink transmission performed before receiving the first system information.

A first apparatus according to an embodiment may, in transmitting the second transport block to the second apparatus, transmit the second transport block to the second apparatus on the exceptional resource pool, based on a sidelink configuration related to second system information of a previous validity area. In this case, the sidelink configuration related to the second system information may be applied to a sidelink transmission performed before receiving the first system information.

According to an embodiment of the present disclosure, a second apparatus for performing sidelink communication may be proposed. The second apparatus may comprise: one or more memories storing instructions; one or more transceivers; and one or more processors connected to the one or more memories and the one or more transceivers, wherein the one or more processors execute the instructions to: receive a first transport block from a first apparatus on a resource allocated by a sidelink (SL) grant the first apparatus received from a base station; and receive a second transport block from the first apparatus on an exceptional resource pool, wherein the second transport block is transmitted from the first apparatus on the exceptional resource pool based on that the first apparatus transmits a system information request message requesting system information to the base station.

Various embodiments of the present disclosure may be independently implemented. Alternatively, the various embodiments of the present disclosure may be implemented by being combined or merged. For example, although the various embodiments of the present disclosure have been described based on the 3GPP LTE system for convenience of explanation, the various embodiments of the present disclosure may also be extendedly applied to another system other than the 3GPP LTE system. For example, the various embodiments of the present disclosure may also be used in an uplink or downlink case without being limited only to direct communication between UEs. In this case, a base station, a relay node, or the like may use the proposed method according to various embodiments of the present disclosure. For example, it may be defined that information on whether to apply the method according to various embodiments of the present disclosure is reported by the base station to the UE or by a transmitting UE to a receiving UE through pre-defined signaling (e.g., physical layer signaling or higher layer signaling). For example, it may be defined that information on a rule according to various embodiments of the present disclosure is reported by the base station to the UE or by a transmitting UE to a receiving UE through pre-defined signaling (e.g., physical layer signaling or higher layer signaling). For example, some embodiments among various embodiments of the present disclosure may be applied limitedly only to a resource allocation mode 1. For example, some embodiments among various embodiments of the present disclosure may be applied limitedly only to a resource allocation mode 2.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 19:
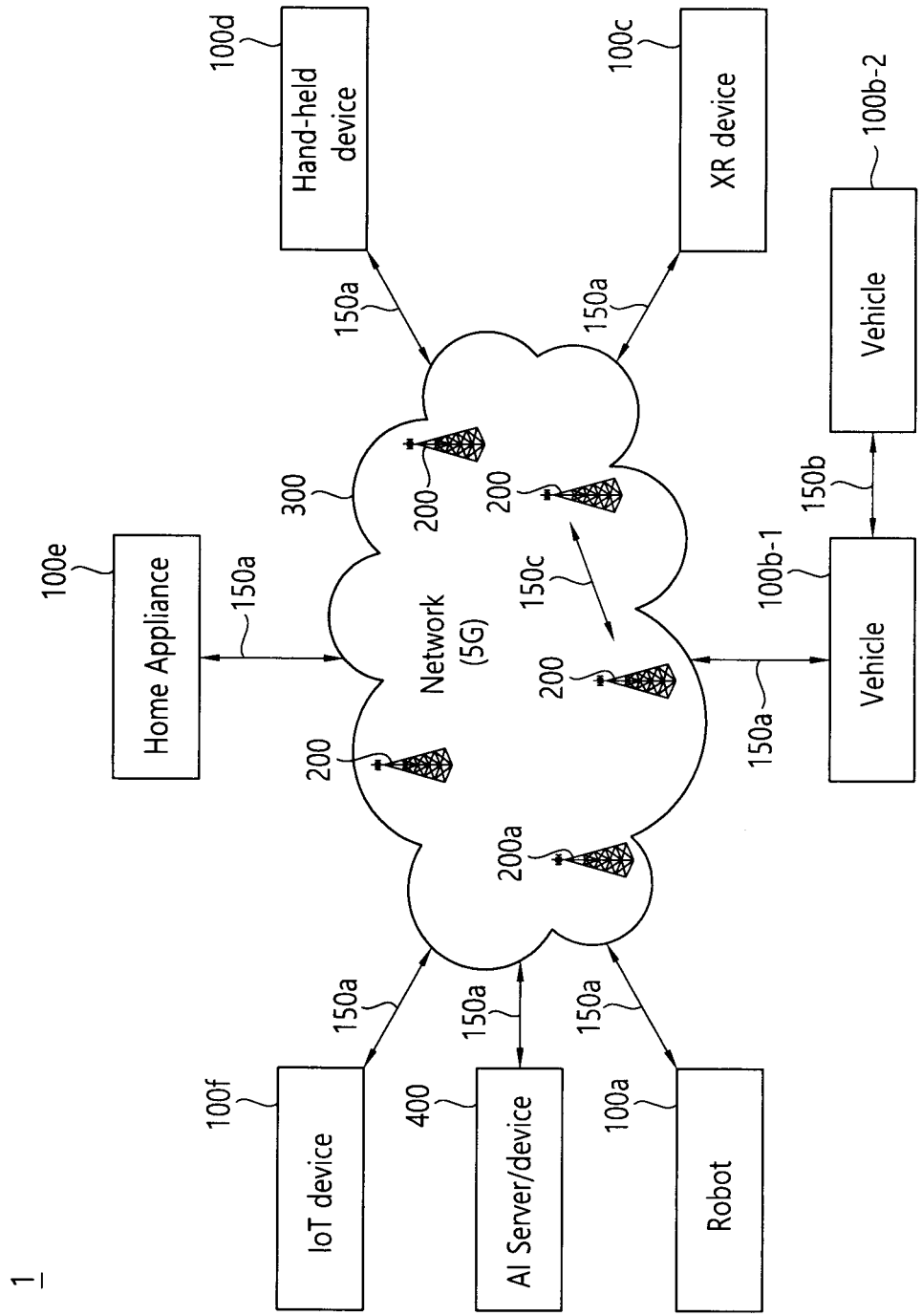
FIG. 19 shows a communication system 1, based on an embodiment of the present disclosure.

FIG. 19 shows a communication system 1, based on an embodiment of the present disclosure.

Referring to FIG. 19, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
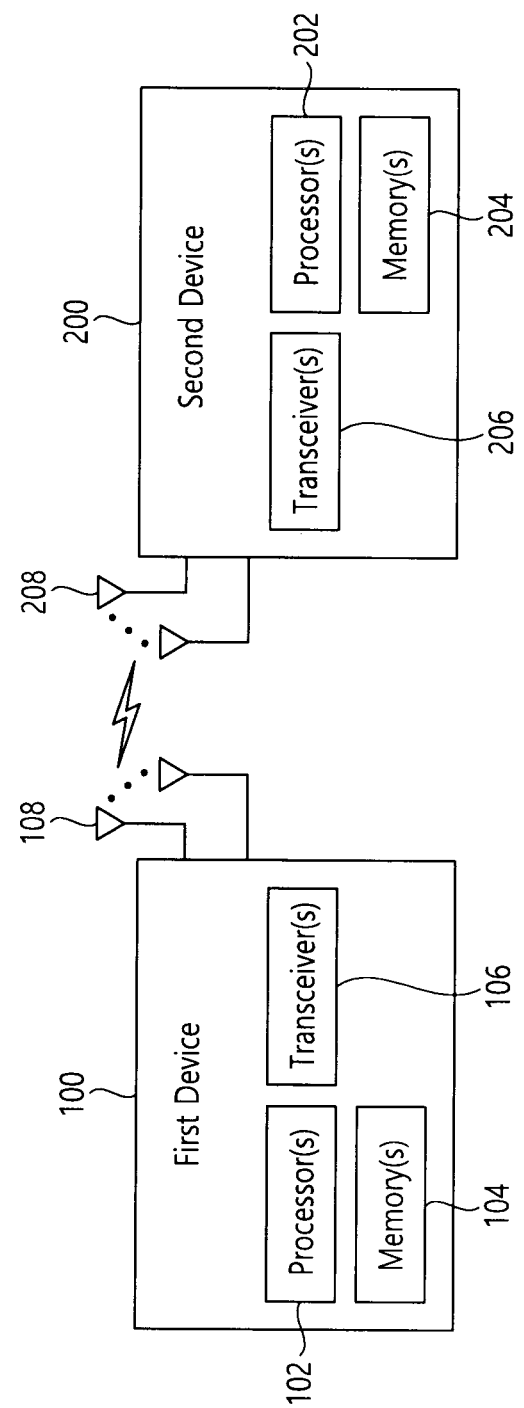
FIG. 20 shows wireless devices, based on an embodiment of the present disclosure.

FIG. 20 shows wireless devices, based on an embodiment of the present disclosure.

Referring to FIG. 20, a first wireless device 100 and a second wireless device 200 may transmit radio signals through a variety of RATs (e.g., LTE and NR). Herein, (the first wireless device 100 and the second wireless device 200) may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 21:
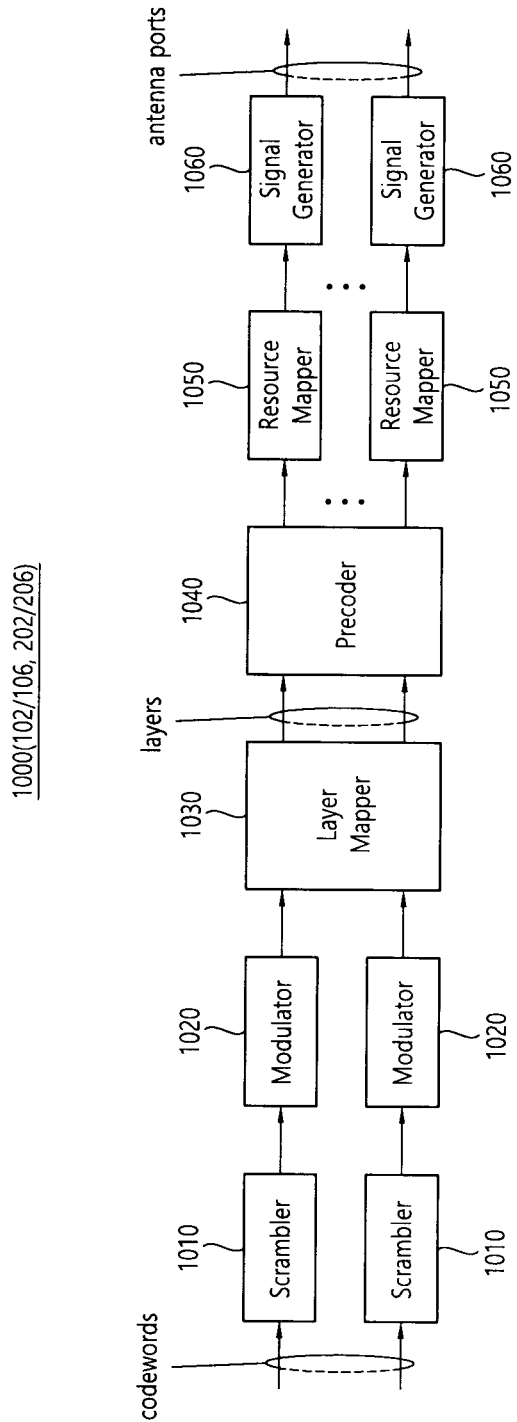
FIG. 21 shows a signal process circuit for a transmission signal, based on an embodiment of the present disclosure.

FIG. 21 shows a signal process circuit for a transmission signal, based on an embodiment of the present disclosure.

Referring to FIG. 21, a signal processing circuit 1000 may include scramblers 1010, modulators 1020, a layer mapper 1030, a precoder 1040, resource mappers 1050, and signal generators 1060. An operation/function of FIG. 21 may be performed, without being limited to, the processors 102 and 202 and/or the transceivers 106 and 206 of FIG. 20. Hardware elements of FIG. 21 may be implemented by the processors 102 and 202 and/or the transceivers 106 and 206 of FIG. 20. For example, blocks 1010 to 1060 may be implemented by the processors 102 and 202 of FIG. 20. Alternatively, the blocks 1010 to 1050 may be implemented by the processors 102 and 202 of FIG. 20 and the block 1060 may be implemented by the transceivers 106 and 206 of FIG. 20.

Codewords may be converted into radio signals via the signal processing circuit 1000 of FIG. 21. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 21. For example, the wireless devices (e.g., 100 and 200 of FIG. 20) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 22:
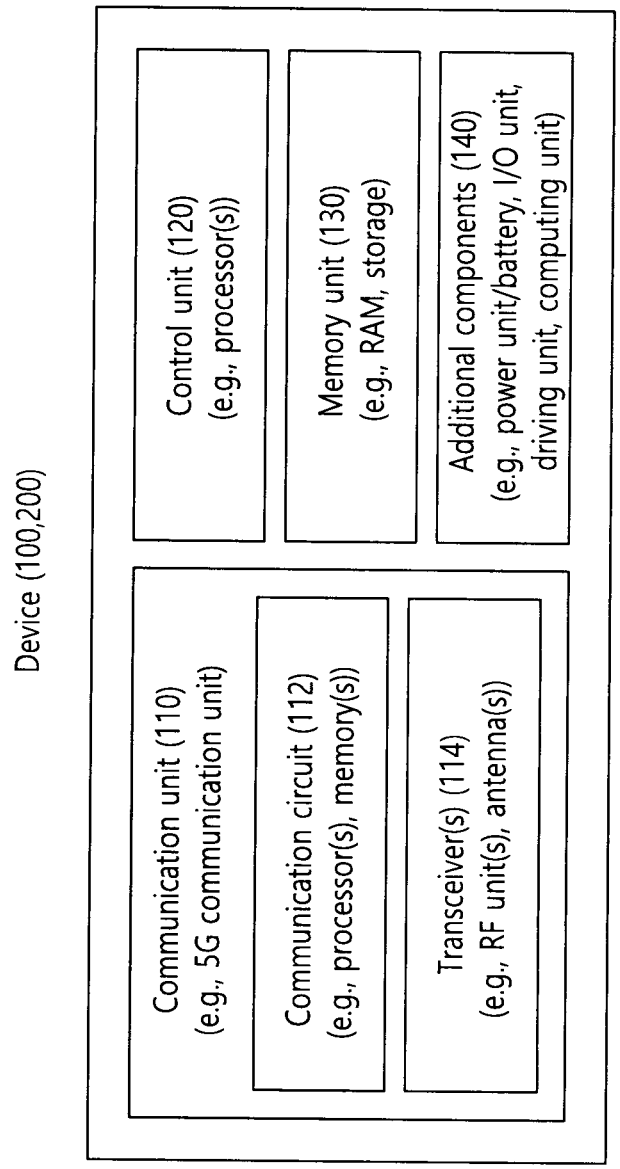
FIG. 22 shows another example of a wireless device, based on an embodiment of the present disclosure.

FIG. 22 shows another example of a wireless device, based on an embodiment of the present disclosure. The wireless device may be implemented in various forms according to a use-case/service (refer to FIG. 19).

Referring to FIG. 22, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 22 will be described in detail with reference to the drawings.

Figure 23:
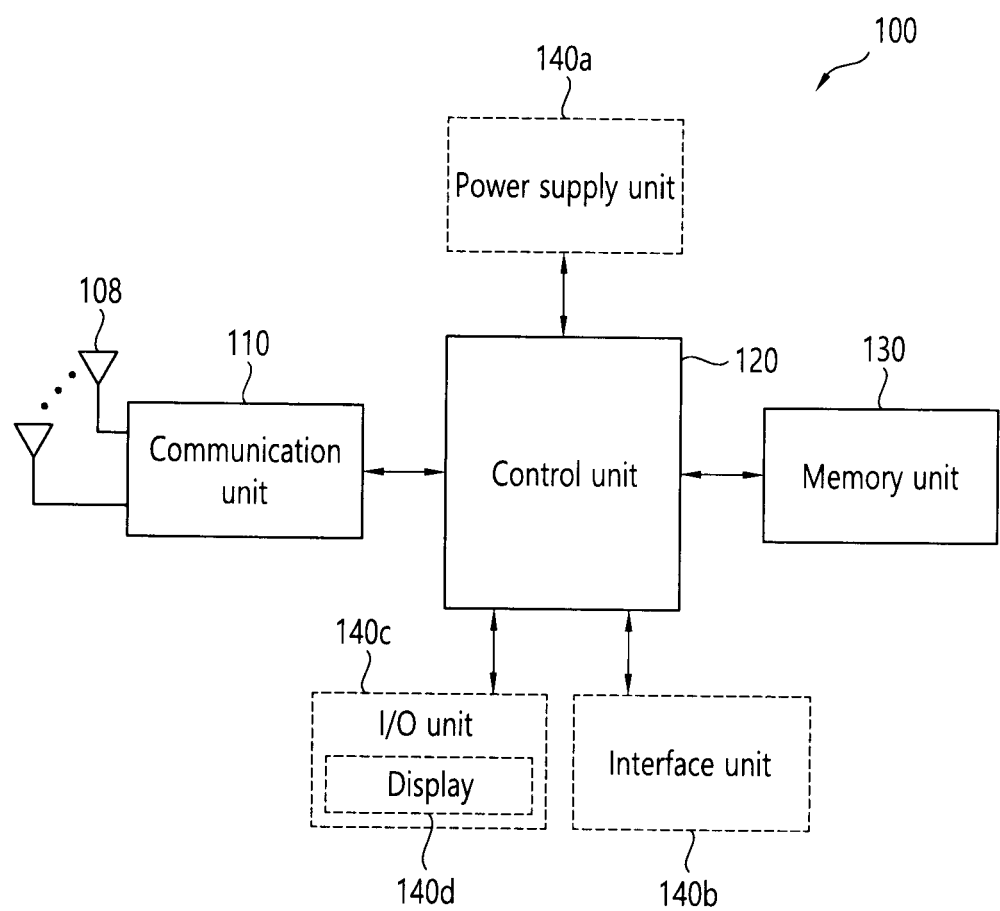
FIG. 23 shows a hand-held device, based on an embodiment of the present disclosure.

FIG. 23 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 23, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 22, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 24:
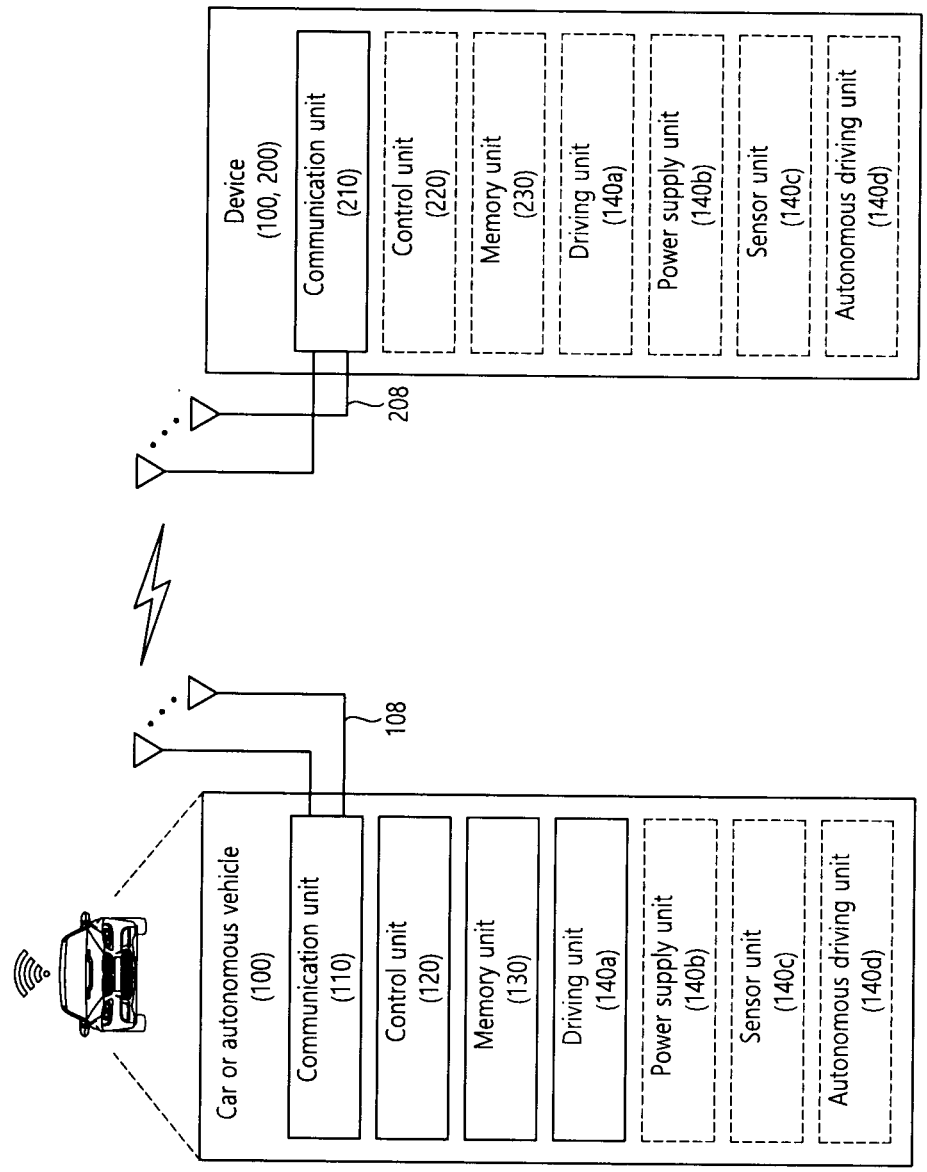
FIG. 24 shows a vehicle or an autonomous vehicle, based on an embodiment of the present disclosure.

FIG. 24 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 24, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as apart of the communication unit 110. The blocks 110/130/140a to 140d correspond to the blocks 110/130/140 of FIG. 22, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The scope of the disclosure may be represented by the following claims, and it should be construed that all changes or modifications derived from the meaning and scope of the claims and their equivalents may be included in the scope of the disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first apparatus, sidelink communication, the method comprising:
    transmitting a first transport block to a second apparatus on a resource allocated from a base station, before transmitting an on-demand system information request message requesting first system information;
    transmitting the on-demand system information request message to the base station, at a first time point;
    transmitting a second transport block to the second apparatus on an exceptional resource pool within a time interval from the first time point at which the on-demand system information request message is transmitted and until a second time point at which the first system information is received from the base station, based on the on-demand system information request message being transmitted to the base station; and
    receiving the first system information related to the on-demand system information request message, from the base station, at the second time point.

2. The method of claim 1, wherein the first apparatus has a radio resource control (RRC) connection with the base station established.

3. The method of claim 1, wherein the first system information includes an initial access message or a broadcast message.

4. The method of claim 1, wherein a time resource period for the second transport block allocated by a second SL grant related to an SL grant request transmission exceeds a latency requirement of the second transport block, based on that the SL grant request transmission for the transmission of the second transport block is delayed by the transmission of the on-demand system information request message.

5. The method of claim 4, wherein the SL grant request transmission includes at least a scheduling request (SR) or a buffer status report (BSR), for the transmission of the second transport block.

6. The method of claim 1, wherein the exceptional resource pool is predefined.

7. The method of claim 1, wherein the second transport block is transmitted based on the on-demand system information request message being transmitted to the base station and a dedicated configuration, and
    wherein the dedicated configuration is predefined to apply to a sidelink transmission performed within the time interval from the first time point and until the second time point.

8. The method of claim 1, wherein t the second transport block is transmitted based on the on-demand system information request message being transmitted to the base station and a sidelink configuration related to second system information of a previous validity area, and wherein the sidelink configuration related to the second system information is applied to a sidelink transmission performed within the time interval from the first time point and until the second time point.

9. A first apparatus for performing sidelink communication, the first apparatus comprising:
one or more memories storing instructions;
one or more transceivers; and
one or more processors connected to the one or more memories and the one or more transceivers, wherein the one or more processors execute the instructions to:
transmit a first transport block to a second apparatus on a resource allocated from a base station, before transmitting an on-demand system information request message requesting first system information;
transmit the on-demand system information request message to the base station, at a first time point;
transmit a second transport block to the second apparatus on an exceptional resource pool within a time interval from the first time point at which the on-demand system information request message is transmitted and until a second time point at which the first system information is received from the base station, based on the on-demand system information request message being transmitted to the base station; and
receive the first system information related to the on-demand system information request message, from the base station, at the second time point.

10. The first apparatus of claim 9, wherein the first apparatus has a radio resource control (RRC) connection with the base station established.

11. The first apparatus of claim 9, wherein the first system information includes an initial access message or a broadcast message.

12. An apparatus configured to control a first user equipment (UE), the apparatus comprising:
one or more processors; and
one or more memories operably connectable to the one or more processors and storing instructions, wherein the one or more processors execute the instructions to:
transmit a first transport block to a second UE on a resource allocated from a base station, before transmitting an on-demand system information request message requesting first system information;
transmit the on-demand system information request message to the base station, at a first time point;
transmit a second transport block to the second UE on an exceptional resource pool within a time interval from the first time point at which the on-demand system information request message is transmitted and until a second time point at which the first system information is received from the base station, based on the on-demand system information request message being transmitted to the base station; and
receive the first system information related to the on-demand system information request message, from the base station, at the second time point.

* * * * *